Dec. 17, 1929.  J. M. SEYMOUR  1,739,867
COOLING TOWER
Filed Aug. 12, 1927   2 Sheets-Sheet 1

INVENTOR.
James M. Seymour,
BY
George D. Richards
ATTORNEY.

Patented Dec. 17, 1929

1,739,867

UNITED STATES PATENT OFFICE

JAMES M. SEYMOUR, OF NEWARK, NEW JERSEY

COOLING TOWER

Application filed August 12, 1927. Serial No. 212,473.

This invention relates, generally, to improvements in cooling towers for cooling condenser water and for similar uses; and the invention has references also to improvements in the general kind and type of cooling tower shown in my prior United States Letters Patent No. 1,582,550, dated April 27th, 1926.

In the vertical type of cooling tower most commonly used prior to the type of tower shown in my aforesaid earlier patent, the water to be cooled is caused to fall from the top of the tower to the bottom thereof through an ascending column of air usually produced by forced draft. Frequently such towers were provided with baffles of one kind or another to check a too rapid fall of water, but said baffles in such connection possessed the disadvantage of impeding the air currents, often to such extent that an abnormal amount of power was required to force the air upwardly through the tower, thus adding considerably to the cost of operating the tower.

It is the object of my present invention to provide a short fall for the water at right angles to a longitudinally moving body of air, whereby the advantages of relatively short fall distances for the water (which advantages will be hereinafter more particularly referred to) may be provided by means of baffles without setting up undue resistance to air flow, so that an efficient cooling action of the air upon the water may be attained in accordance with the principles of my aforesaid patent, but with a minimum expenditure of power and a consequent very appreciable saving in cost of operation. In the improved cooling tower of the instant invention I provide across the path of descent of water therethrough a series of vertically spaced perforate baffles or shelves which define or bound horizontal spaces through which the air may pass from the point of ingress to the point of egress thereof, so that said shelves or baffles, while adequately retarding the water, offer no appreciable impediment to the movement of air through the water showers descending from baffle to baffle. Another advantage afforded by the preferred form of improved cooling tower construction of this invention is the saving of water effected by reducing the distance of fall thereof so as to prevent dashing of water drops into mist or fine globules likely to be carried away by the air currents, for in the instant invention the vertical fall of water is reduced by the baffles to relatively short stages, so that force of impact of the water drops upon the baffles is reduced and is less likely to produce misting thereof, and so that even if some shattering of drops should occur, the water globules resulting, owing to the centrifugal movement of the air are carried by the latter so as to impinge upon the peripheral walls of the tower and deposit thereon, whereupon the same may trickle down and rejoin the main masses of water again. Secondary to the primary advantage of water conservation thus attained is the further advantage that, escape of water from the tower being prevented, no wetting of adjacent buildings in summer or icing of the same in winter occurs.

Other objects of this invention, not at this time more particularly enumerated, will be clearly understood from the following detailed description of the same.

This invention is clearly illustrated in the accompanying drawings, in which:—

Figure 3 is a horizontal section of the same, taken on line 3—3 in Figure 2.

Similar characters of reference are employed in all of the above described views, to indicate corresponding parts.

Figure 1:
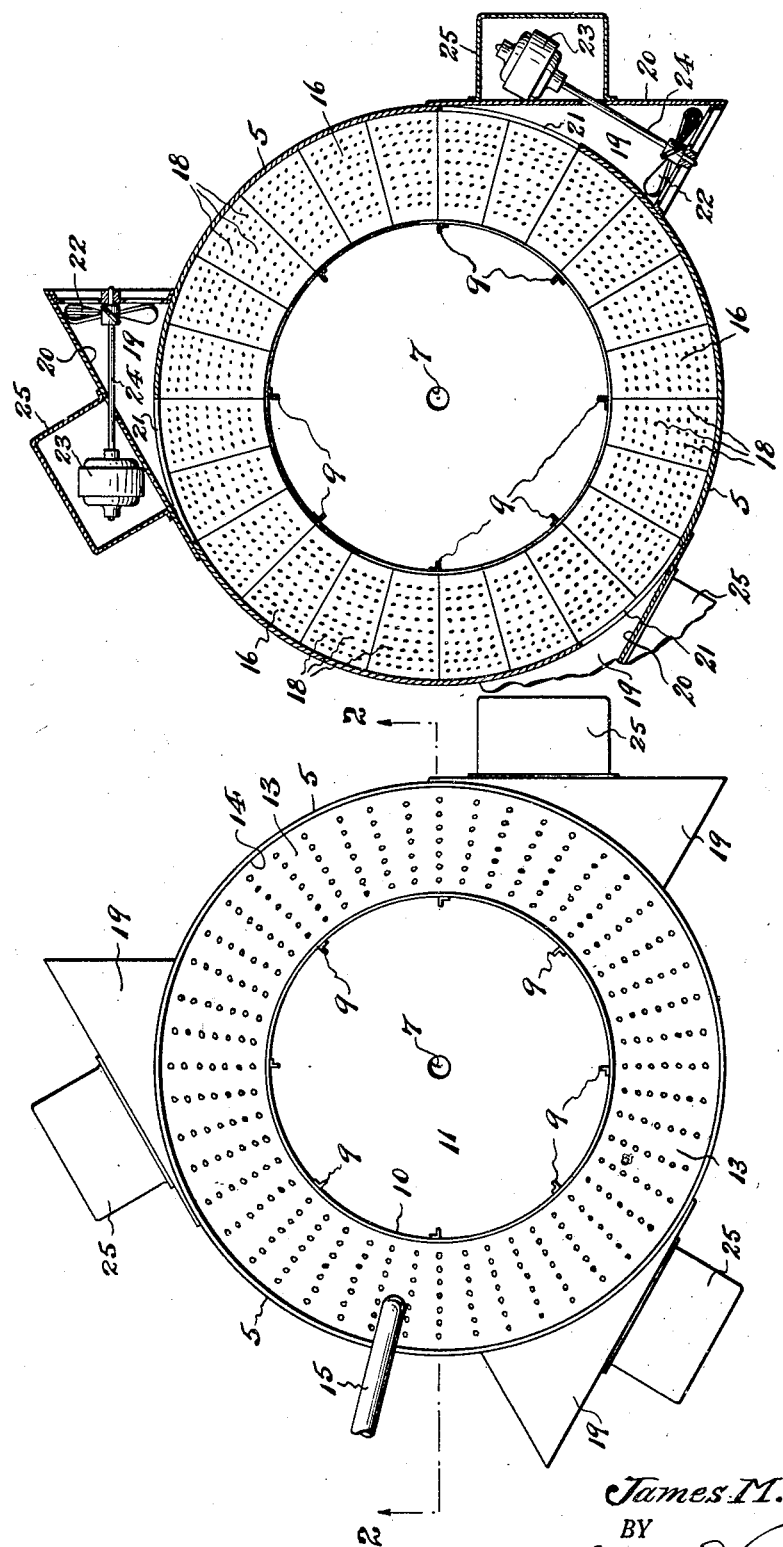
Figure 1 is a top plan view of one form of water cooling tower embodying the principles and novel features of the instant invention.
Figure 2:
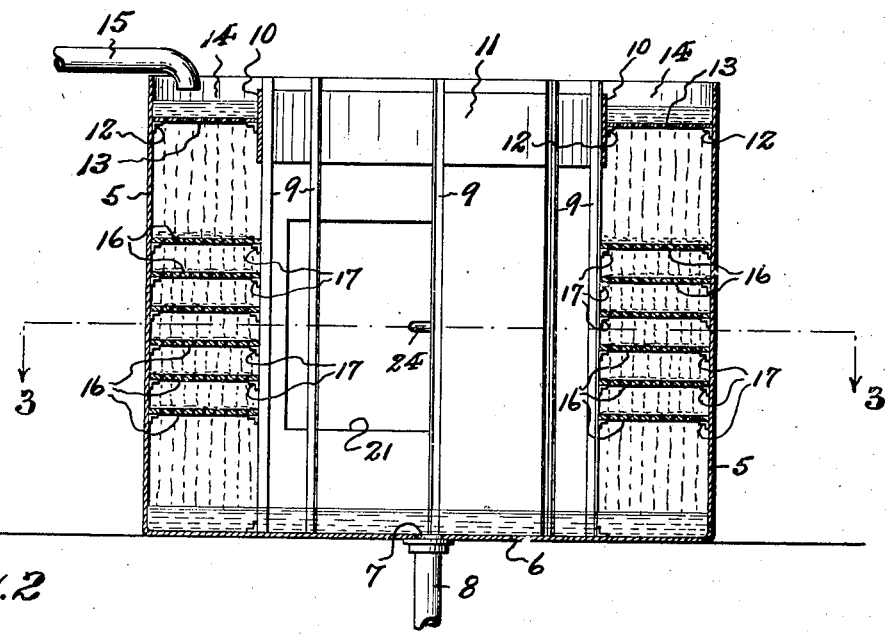
Figure 2 is a vertical section of the same, taken on line 2—2 in Figure 1.

Referring first to Figures 1, 2 and 3 of said drawings, the reference character 5 indicates the cylindrical tower housing provided with a closed bottom 6, having a central outlet 7 with which is connected a discharge pipe 8 for conveying away the cooled water. Said tower housing may be constructed of sheetmetal, wood, masonry, concrete or of any other suitable material.

Spaced inwardly from the walls of said tower housing, and disposed in a row concentric to said walls, are a plurality of vertical posts 9. Secured to said posts, so as to be supported thereby within the upper end of said tower housing, is a vertical concentric inner wall member 10 which defines the air discharge opening 11 at the top of said tower housing. Extending horizontally between said tower housing 5 and said inner wall member 10, and suitably supported by angle irons 12 or the like, is a perforate trough-floor 13, which with said outer and inner walls provides a concentric receiving trough 14 at the top of the tower, into which water to be cooled is delivered by a delivery pipe 15 or other suitable conveying means.

Arranged beneath said trough 14 within the interior of said tower are a plurality of vertically spaced annular shelves or baffles 16, suitably supported by angle-irons 17 or other convenient means between the tower wall 5 and posts 9. Each shelf or baffle is preferably formed by a series of assembled sections or segments each of which is provided with perforations 18 to permit the passage of water downwardly therethrough. Said sections or segments may be made of wood, metal, glass, non-soluble fibrous material, or the like. Said shelves or baffles extend in substantially horizontal plane, and are spaced but a short distance apart compared with the height of the tower, so as to extend around the interior of the tower, with intermediate air spaces opening toward the central interior portion of the tower, all in such manner that the water is subjected to a comparatively short fall from baffle to baffle through said spaces while subjected to the cooling effects of the air introduced within and caused to pass horizontaly through said spaces to the central interior portion of the tower, whence the same may escape upwardly through the discharge opening 11.

Said tower housing 5 is provided with one or more air delivery devices adapted to deliver air tangentially into the interior annular spaces between said baffles 16. Each air delivery device comprises an intake chamber 19 the outer wall 20 of which is substantially tangent to the wall of said tower housing 5, the latter having an air admission opening 21 in communication with said intake chamber 19. The outer end of said intake chamber 19 is open to the atmosphere. Mounted within each intake chamber 19 is a transversely disposed air propulsion fan 22. The fan 22 may be suitably driven from any source of power, but is preferably directly driven by an electric-motor 23, on the armature shaft 24 of which said fan is fixed. For convenience there is provided, in projection from the outer wall 20 of said intake chamber, a motor housing 25, the arrangement being such that the armature shaft 24 projects through said outer wall 20 into the intake chamber 19 to the fan location, as shown more especially in Figure 3 of the drawings.

In the operation of the preferred form of cooling tower, constructed as above described, hot water or other liquid desired to be cooled, is delivered through the pipe 15 into the distributing or receiving trough 14 at the top of the tower. The hot water contained in said trough 14 is discharged through its perforate bottom 13 to rain downwardly through the outer annular portions of the tower interior. The hot water thus introduced within the tower falls a relatively short distance wherefrom it encounters the uppermost perforate baffle 16 which retards its fall; thence the water drains through the perforations of the first baffle to rain down through the comparatively short intermediate space to the second perforate baffle, and so on until it is finally in the bottom of the tower sufficiently cooled to be discharged through the discharge pipe 8. It will thus be obvious that the fall of water is by short stages, each stage being of a relatively short distance so that tendency of the water drops to splash or be shattered into fine mist likely to be carried away by outgoing air with consequent appreciable loss of water is prevented; such prevention of mist or spray formation has the further advantage of permitting the use of more rapidly moving air currents to more quickly cool the water by increasing evaporation with but a minimum loss of water mass.

The air intake passages 19 direct streams of air tangentially into the annular spaces intermediate the baffles 16, so that the air within the tower interior and adjacent to the baffles, is caused to whirl or gyrate horizontally or in planes parallel to said baffles so that said baffles offer no impediment to the free movement of said air streams. The hot water rains downwardly through said rotating streams of air and in contact therewith so that a cooling effect of the air upon the water is produced both by direct transfer of heat from the latter to the former and by evaporation of a small percentage of the water and its absorption by moving air streams. The whirling or gyrating movement of incoming air pushes previously entered and saturated air from the spaces intermediate the baffles and into the central opening portion of the tower interior, whence the same escapes upwardly through the air discharge opening 11 of the tower. The whirling or gyrating movement of the air also produces a centrifugal action tending to throw any free fine globules of unevaporated water which may occur toward the tower walls upon which the same is deposited so as to trickle down thereupon to rejoin the water masses, thus additionally guarding against undue water losses.

Figure 4:
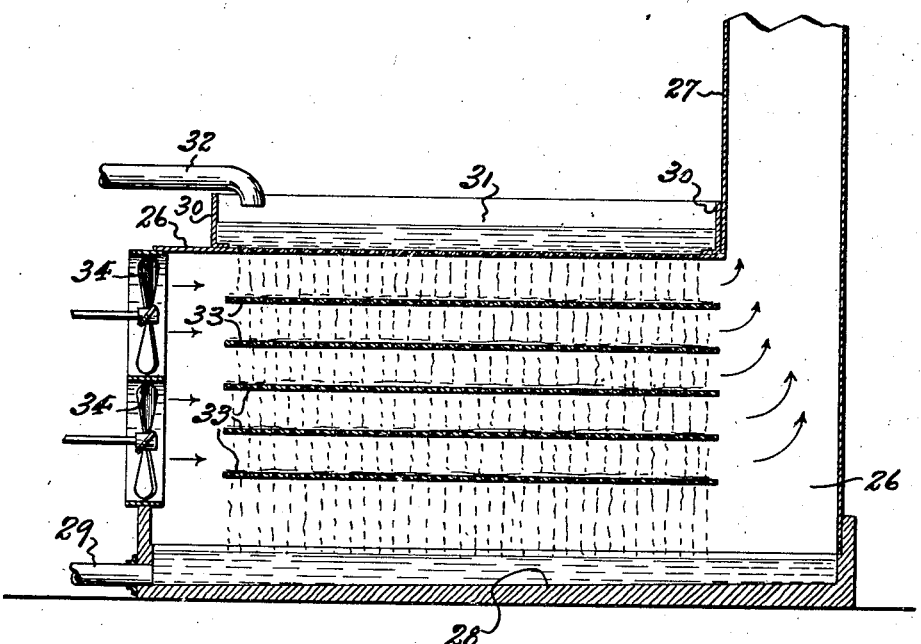
Figure 4 is a view in vertical longitudinal section showing a modified form of cooling tower embodying however the general principles of the instant invention.

Referring now to Figure 4 of the drawings I have shown therein a modified form of cooling tower which embodies the major principles of the instant invention, but which instead of providing for tangential air delivery with consequent gyration of air streams, affords merely a rectilinear movement of air horizontally intermediate water retarding baffles and at right angles to the gravitation of water through the tower interior and its baffles. This modified form of cooling tower comprises a suitably constructed longitudinal housing 26 open at one end and provided at its opposite end with an air discharge conduit or stack 27. The lower end or bottom of said housing 26 is disposed over a suitable catch basin 28 from which leads a water discharge pipe 29. The upper or top wall of said housing is provided with an exterior upstanding flange 30 to form a water receiving basin, 31, the portion of said top wall within said basin 31 being perforated as indicated to deliver water or other liquid to be cooled for gravitation through the housing interior to said catch basin 28. A water delivery pipe 32, or other suitable conveying means is provided to deliver the water to be cooled to said receiving basin 31. Disposed horizontally across the housing interior are a series of vertically spaced apart perforate shelves or baffles 33, adapted to reduce the fall of water through the housing interior to a series of comparatively short stages through air spaces intermediate said baffles. Mounted within the open end of said housing are one or more suitably driven air delivery fans 34 which operate to impel streams of air to flow through the spaces intermediate said baffles 33 at right angles to the gravitation of the water showers and in contact therewith, said streams being finally discharged through the conduit or stack 27. It will be obvious, that the main advantages of retarding the water showers, and minimizing splash and disruption of the water drops by reducing the fall thereof to short stages, while nevertheless bringing said water showers into contact with free substantially unimpeded streams of air whereby heat may be transferred to the air from the water is attained by the modified structure immediately above described, and that such structure is within the broad general principles of the instant invention.

I am aware that some changes, other than those above indicated, may be made in the general arrangements and combinations of the various devices and parts comprising this invention, as well as in the details of the construction of the same, without departing from the scope thereof as set forth in the foregoing specification, and as defined in the appended claims. Hence, I do not limit this invention to the exact arrangements and combinations of the devices and parts as set forth in said specification, nor do I confine myself to the exact details of the construction of said parts as illustrated in the accompanying drawings.

I claim:—

1. A cooling tower, comprising a vertical substantially cylindrical tower housing having at its upper end an axially aligned air discharge opening, means at the upper end of said housing to deliver liquid to be cooled for gravitation through the annular outer interior portions of said housing, means at the lower end of said housing to collect and discharge the gravitated liquid, a series of substantially horizonal annular perforate baffles vertically spaced and positioned in the annular outer interior portions of said housing, said baffles being disposed across the path of gravitating liquid to reduce the fall thereof to successive relatively short stages, and means for tangentially delivering and rotating streams of air within said tower housing and intermediate said baffles in planes substantially parallel to the latter whereby movement of said air in contact with said gravitating liquid is unimpeded by said baffles, said air, upon becoming saturated, being forced by incoming air to the inner portion of said housing to be discharged through said discharge opening.

2. A cooling tower, comprising a vertical substantially cylindrical tower housing, a concentric inner wall member of substantially reduced diameter within the upper end of said housing adapted to bound a central air discharge opening at said upper end of said housing, a perforate horizontal bottom partition fixed between said housing and said inner wall member to form with said parts a receiving trough at the upper end of said housing adapted to discharge liquid to be cooled for gravitation through the annular outer interior portions of said housing, means at the lower end of said housing to collect and discharge the gravitated liquid, a series of substantially horizontal annular perforate baffles vertically spaced and disposed across the path of gravitating liquid to reduce the fall thereof to successive relatively short stages, and means for tangentially delivering and rotating streams of air within said housing and intermediate said baffles in planes substantially parallel to the latter whereby movement of said air in contact with said gravitating liquid is unimpeded by said baffles.

In testimony, that I claim the invention set forth above I have hereunto set my hand this 9th day of August, 1927.

JAMES M. SEYMOUR.